United States Patent [19]
De Filippis et al.

[11] Patent Number: 5,793,169
[45] Date of Patent: Aug. 11, 1998

[54] METHOD AND APPARATUS FOR CONTROLLING STATIC ELECTRONIC COMPONENTS FOR PHASE SWITCHING IN A THREE-PHASE BRUSHLESS ELECTRIC MOTOR

[75] Inventors: Pietro De Filippis, Monza; Massimo Piazza, Turin, both of Italy

[73] Assignee: Bitron S.p.A., Pinerolo, Italy

[21] Appl. No.: 731,515

[22] Filed: Oct. 15, 1996

[30] Foreign Application Priority Data

Oct. 17, 1995 [IT] Italy ................ TO 95/A/000831

[51] Int. Cl.$^6$ ............................................ H02P 6/02
[52] U.S. Cl. ................... 318/254; 318/138; 318/439
[58] Field of Search ............................ 318/138, 139, 318/245, 254, 439, 280–293, 599, 800–811

[56] References Cited

U.S. PATENT DOCUMENTS

| | | | |
|---|---|---|---|
| 4,903,188 | 2/1990 | Madhavan et al. | 363/96 |
| 5,253,156 | 10/1993 | Sakurai et al. | 363/98 |
| 5,287,044 | 2/1994 | Izawa et al. | 318/254 |
| 5,291,106 | 3/1994 | Murty et al. | 318/375 |
| 5,373,436 | 12/1994 | Yamaguchi et al. | 318/811 |

FOREIGN PATENT DOCUMENTS

| | | |
|---|---|---|
| 381 597 | 8/1990 | European Pat. Off. . |
| 521 709 | 1/1993 | European Pat. Off. . |
| 642 213 | 3/1995 | European Pat. Off. . |
| 92 04 811 | 8/1993 | Germany . |

*Primary Examiner*—Paul Ip
*Attorney, Agent, or Firm*—Merchant, Gould, Smith, Edell, Welter & Schmidt

[57] ABSTRACT

In an apparatus for controlling static electronic components in the control circuit of a three-phase brushless electric motor, a single shunt device (RS) is used for limiting at least one of the phase currents (IF, I1, I2, I3) of the motor (MT) to a preset limit value. A signal generator device (GS) interrupts the switching of the static electronic components (T1, T2, T3, B1, B2, B3) when the voltage (VS) at the ends of the shunt device (RS) exceeds a preset limit current value. Phase current limitation of the motor (MT) is attained using a PWM technique, alternatively modulating two static electronic components (T1, B2 or B3; T2, B1 or B3; T3, B1 or B2) that are comprised in the electric circuit branch in which there is electric continuity at any instant of the control sequence.

5 Claims, 9 Drawing Sheets

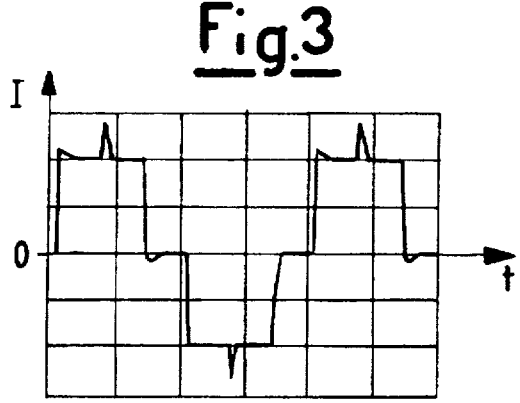
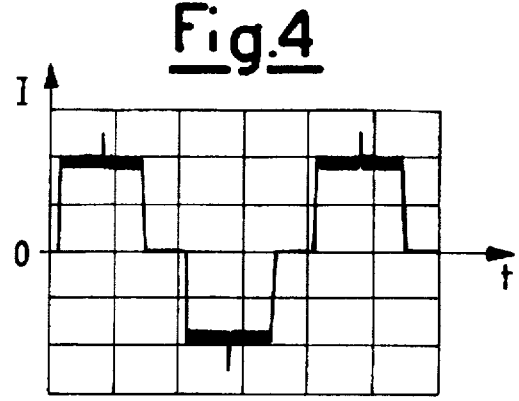
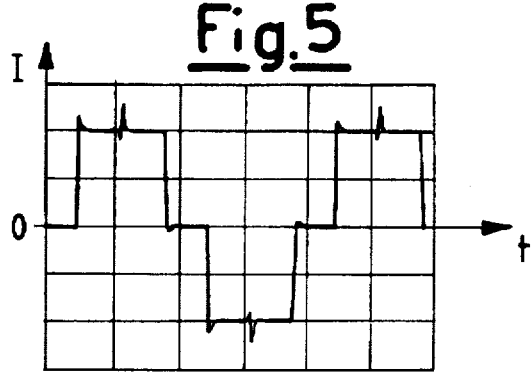
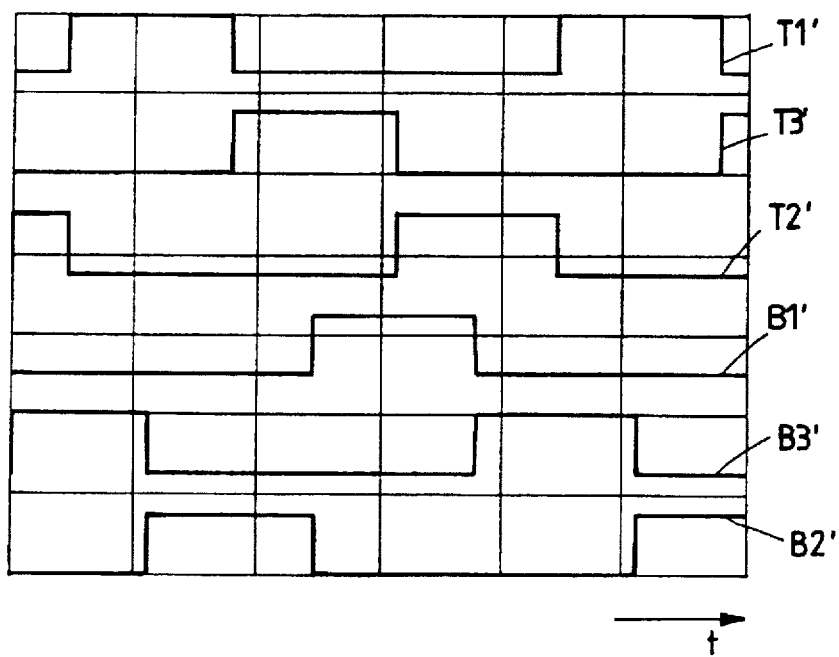

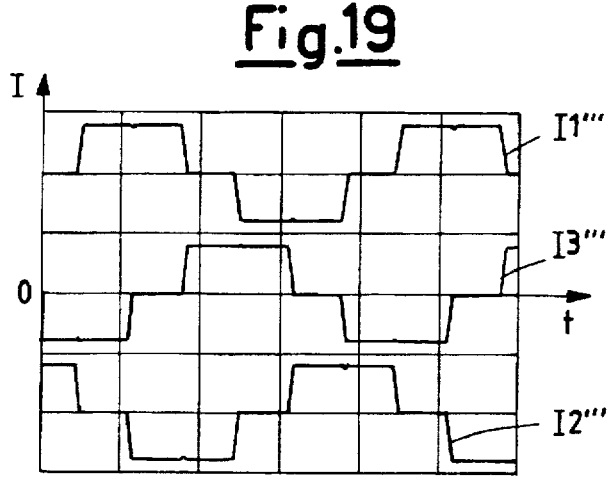
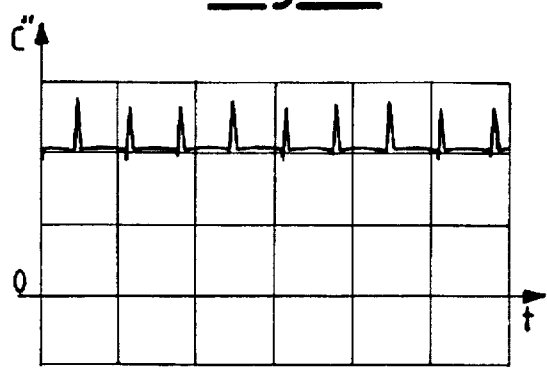 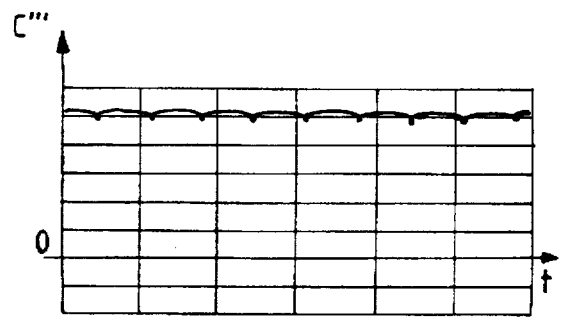

METHOD AND APPARATUS FOR CONTROLLING STATIC ELECTRONIC COMPONENTS FOR PHASE SWITCHING IN A THREE-PHASE BRUSHLESS ELECTRIC MOTOR

DESCRIPTION

FIELD OF THE THE INVENTION

The present invention refers to a method and apparatus for controlling static electronic components in the control circuit of a three-phase brushless electric motor. The invention further relates to a control apparatus for implementing such a method.

BACKGROUND OF THE INVENTION

With three-phase brushless electric motors, the rotor and stator are provided with an electronic switch connected to a direct current power supply and controlled by a rotor position sensor. The switch cyclically supplies the stator phases by generating signals for controlling static electronic components.

The electronic switch is so controlled as to supply the stator with currents capable of generating a magnetic field always perpendicular to that of the rotor produced by the rotor magnets, thereby providing interaction of magnetic fields and torque generation typical of direct current motors.

Operation of a three-phase brushless electric motor requires the switching of phases by suitably inverting the current in the various stator coils. This is accomplished by means of static electronic components (junction transistors, MOSFET transistors, thyristors, IGBT, GTO), which act as an open or closed circuit depending on the angular position of the rotor.

Such electronic components replace brush-commutator assemblies of direct current motors, whilst information concerning angular position of the rotor is attained by the provision of Hall effect position sensors, optical sensors, photo-cells.

The mechanical torque generated by the motor is equal to the sum of the torques generated by each of the three phases. Each torque generated by each phase is in turn proportional to the electromotive force and the intensity of the phase current.

Generally, switching of phases is attained by controlling a plurality of static electronic components in a bridge arrangement following a specific sequence: the correct sequence is the one by which the currents, interacting with the rotor inductance, always yield a torque in the same direction.

With this kind of electric motors, to reduce noise (that is always considerable) the torque has to be kept at a constant level in time as much as possible, otherwise it would cause vibration in the motor structure. This means that it the e.m.f. and the phase current have to be substantially constant with time.

To this end it is possible to intervene on mechanical and electric components. There are known three-phase brushless electric motors wherein the physical and geometric characteristics of the rotor permanent magnets and the stator magnetic circuit (laminations) are so designed as to yield a trapezium-like e.m.f. waveform. A relatively constant torque for each phase is attained by controlling the static electronic components in time intervals in which the e.m.f. is constant and keeping the current constant in each phase. However, in order to keep the current in each phase of the motor substantially constant it is required to provide controlled current in a closed pattern.

Where high dynamic performance is required, it is necessary to provide control structures allowing to accurately control the flux at the air gap and adjust the torque promptly. The conventional current commutator is so replaced by a PWM voltage inverter which works as a current source as it is provided with current adjusting loops for limiting the current in the motor phases to a preset value. In this way, the stator of the machine is supplied with sinusoidal currents, with the advantage of attenuating torque ripples of the step-current inverter.

The PWM inverter solution obviously provides good performances as concerns speed control and motor torque ripple, whereas simultaneous adjustment of voltage amplitude and frequency requires the circuits for controlling the inverter to be more sophisticated and have more components, also for reducing harmonics.

In addition, the performances of this kind of control are hindered by the need for accuracy concerning the motor parameters and the devices of the control system. There is also a need to electronically interrupt high currents and consequently vary voltage and current waveforms appropriately, as well as provide rapid control, high efficiency and low operation noise, i.e. typical features of brushless electric motors.

Motor efficiency decreases as current fluctuation rises to a predetermined value. Therefore, the need to increase switching frequency in static electronic components derives from the requirement of limiting current oscillations. However, quick switching is the cause of transients which are responsible for instant forces radially directed on the air gap of the electric machine, which is deformed by this stress and so becomes noisy.

SUMMARY OF THE INVENTION

An object of the present invention is to provide a method of controlling static electronic components for providing phase switching in a three-phase brushless electric motor, capable of overcoming the above cited drawbacks and guaranteeing rapid control of the motor speed at equal efficiency and reducing noise in the motor structure.

It is another object of the present invention to provide a method of controlling static electronic components for phase switching which minimizes torque ripple with in comparison with prior art by limiting the current in the phases of the brushless motor to a preset value.

A further object of the present invention is to provide an apparatus for controlling static electronic components for the switching of phases in a three-phase brushless electric motor, the apparatus being capable of implementing the above mentioned method.

A still further object of the present invention is to provide such an apparatus which is of simple and low cost construction, making use of less electric and/or electronic components in comparison with prior art apparatuses.

These and further objects which will be more apparent hereinafter are attained according to the present invention by the provision of a control apparatus for controlling static electronic components for the switching of phases in a three-phase brushless electric motor, of the type comprising:

at least one three-phase brushless electric motor power supplied by at least one voltage generator;

a plurality of static electronic components providing the switching of phases by inverting the current in the stator coils of said motor, said static electronic components being disposed in a bridge arrangement each connected in parallel with at least one diode for recirculating the phase current;

at least one signal generator device picking up information from a plurality of position sensors fitted on the motor and sensing angular position of the rotor of said motor, said signal generator device controlling, through digital electric signals, the switching from open circuit to short circuit and vice versa of said static electronic components, according to a predetermined control sequence such that in each instant of said control sequence electric continuity is provided in at least one branch of the electric circuit comprising at least two static electronic components and at least two phases of the motor are controlled;

a plurality of shunt devices the number of which equals the number of phases of said motor, said shunt devices being all connected in parallel and connected to said signal generator device and to said static electronic components, the voltage at the ends of said shunt devices being proportional to the current flowing therethrough, characterized in that said shunt devices are replaced by a single shunt device being used for limiting at least one of the phase currents of the motor to a preset limit value, said signal generator device interrupting the switching of said static electronic components when the voltage at the ends of said shunt device exceeds a preset limit current value, said phase current limitation of the motor being performed using a PWM-like technique, alternatively modulating two static electronic components that are comprised in the electric circuit branch in which there is electric continuity at any instant of said control sequence.

According to another aspect of this invention, there is provided a method of controlling static electronic components for switching the phases in a three-phase brushless motor of the type used in a control apparatus as set forth, characterized in comprising the steps of:

generating digital electric control signals, by said signal generator device, controlling opening or closing of said static electronic components, according to a predetermined control sequence, such that, at any instant of said control sequence there is at least one electric circuit branch composed of a series of at least two static electronic components and at least two phases of said motor;

pulse width modulating alternatively either said two static electronic components for limiting the phase current of the motor to a preset value so as to provide a periodical, symmetrical phase current waveform with limited ripple in comparison with a square wave, said modulation being performed for a preset time interval longer than a first modulation time interval adopted in prior art, a second time interval consisting of the difference between said second and said first time intervals, being such as to allow to set to zero at least one of the phase currents being switched off.

Advantageously, the method of this invention provides for a prolonged time interval in which the switching of the static electronic components for controlling the three-phase motor occurs.

The duration of the time prolongation is such to allow the current to be set to zero in one of the motor phases, i.e. the one being switched off.

Further, the control apparatus preferably implementing the method of this invention makes use of a different control sequence for controlling the static electronic components (and so uses a different electronic switch generating control signals) and less shunt devices in comparison with prior art.

BRIEF DESCRIPTION OF THE DRAWINGS

For a better understanding of the present invention, reference is made to the following detailed description considered in combination with the accompanying drawings in which:

FIG. 3 is a diagrammatic view illustrating the phase current in the motor as a function of time, in the event it is limited to a preset value by modulating one of the two electronic static components which form each branch for conducting phase current;

FIG. 4 is a Cartesian graph showing schematically the variation of the phase current in the motor as a function of time, in the event current is limited to a preset value by simultaneously modulating two static electronic components each forming a branch conducting phase current;

FIG. 5 is a Cartesian graph showing schematically the variation of the phase current in the motor as a function of time, in the event current is limited to a preset value by alternatively modulating two static electronic components each forming a branch conducting phase current;

FIG. 6 schematically shows a first control sequence of the static electronic components as a function of time, supposing the shunt device for limiting the phase current does not intervene;

FIG. 19 is a Cartesian graph showing schematically the variation of the phase currents in the motor relative to the third control sequence for controlling the static electronic components, in accordance with the invention;

FIG. 20 is a Cartesian graph showing schematically the variation of the phase currents and the motor torque, relative to the third control sequence for controlling the static electronic components of FIG. 9, in accordance with this invention;

FIG. 21 is a Cartesian graph showing schematically the variation of the phase currents and the motor torque, relative to the third control sequence for controlling the static electronic components of FIG. 18, in accordance with this invention;

DETAILED DESCRIPTION OF PREFERRED EMBODIMENTS

Figure 1:
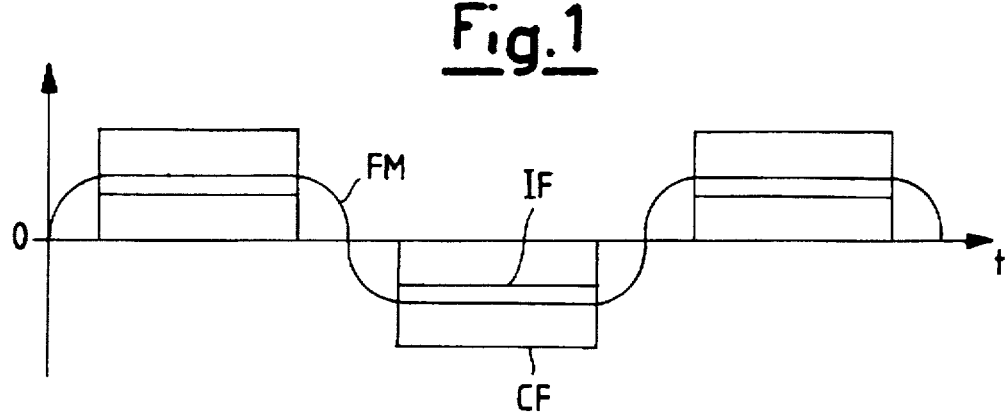
FIG. 1 is a diagrammatic view illustrating e.m.f., current and torque of a three-phase brushless electric motor as a function of time.
Figure 2:
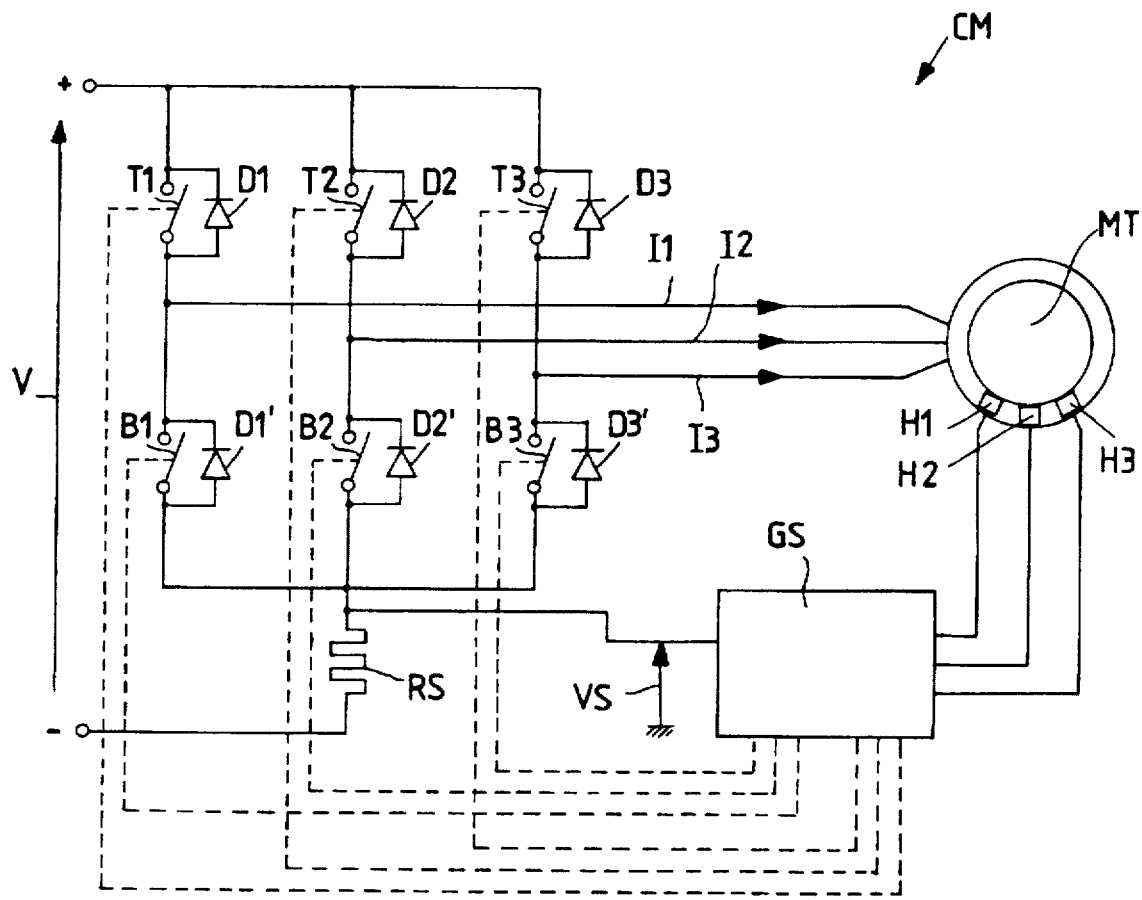
FIG. 2 is a block diagram of the control apparatus for a three-phase brushless in accordance with the invention.

With reference to the drawings, FM schematically indicates the electromotive force as a function of time t of a three-phase brushless electric motor MT; IF indicates the phase current; CF indicates the phase torque.

The apparatus according to the invention for controlling the motor MT is schematically designates at CM, whilst T1, T2, T3, B1, B2, B3 designate static components for phase switching. Each component is electrically connected in parallel to a current recirculation diode designated by D1, D2, D3, D1', D2', D3', respectively. RS designates a shunt device, VS indicates voltage applied at the ends of said shunt device which receives data on the angular position of the motor rotor MT through position sensors H1, H2, H3 and consequently generates signals for controlling the switching of components T1, T2, T3, B1, B2, B3 with the currents of each of the three phases I1, I2, I3, respectively. V designates the sum of voltages at the leads of a pair of static components T1, B1 (or T2, B2; or T3, B3) and of the voltage at the leads of the shunt device RS (proportional to the current flowing in said shunt device RS).

Referring particularly to the Cartesian graphs of FIGS. 3, 4, 5, 6, 7, 8 ,9, 10, 12, 13, 14, 15, 18, 19, 20, 21, I generally designates the phase current, C the phase torque, t designates time, T1', T2', T3', B1', B2', B3' indicate the waveforms of the signals (relative to static electronic components T1, T2, T3, B1, B2, B3, respectively) of a first control sequence of static electronic components T1, T2, T3, B1, B2, B3. T1", T2", T3", B1", B2", B3" indicate the waveforms of the signals of a second control sequence of static electronic components T1, T2, T3, B1, B2, B3. T1'", T2'", T3'", B1'", B2'", B3'" indicate the waveforms of a third control sequence for controlling the static electronic components T1, T2, T3, B1, B2, B3, in accordance with the present invention.

Similarly, I1', I2', I3' indicate the phase current waveforms relative to the first control sequence, I1", I2", I3", indicate the phase current waveforms relative to the second control sequence, I1'", I2'", I3'" indicate the current phase waveforms relative to the third control sequence (according to the present invention); and IRS" indicates the current passing in the shunt device RS, relative to the second control sequence of the static electronic components T1, T2, T3, B1, B2, B3. Moreover, C" and C'" indicate the waveforms of the phase torque, relative to the second and third control sequence, respectively. M and M1 indicate the time intervals in which the static electronic components are closed (relative to and the second and third control sequence, respectively), whilst M2 indicates the difference between the time interval M1 (relative to the third control sequence of the static electronic components T1, T2, T3, B1, B2, B3) and the time interval M (relative to the second control sequence of static electronic components T1, T2, T3, B1, B2, B3).

Phase switching of the three-phase electric motor MT is accomplished by controlling with a suitable sequence (set by the signal generator GS) six static electronic components T1, T2, T3, B1, B2, B3, in a bridge arrangement.

To limit the current I1, I2, I3 in the phases of motor MT to a preset value, a PWM (pulse width modulation) technique is used. Control of the static electronic components T1, T2, T3, B1, B2, B3 is interrupted when the voltage VS exceeds a maximum value corresponding to the current to be limited. At any instant of the control sequence there is continuity in an electric branch consisting of the series of two static electronic components T1, B2, or B3 (or T2, B1 or B3; or T3, B1 or B2), two phases of the motor MT and the shunt device RS. The said electric branch is supplied by the voltage V of the electric bridge. Limitation of current in the electric branch being considered is attained by modulating (using the PWM method) alternatively the first and the second static electronic components (T1, B2 or B3; or T2, B1 or B3; or T3, B1 or B2) being part of the branch.

This allows to provide a current waveform symmetrical with time and with limited oscillations relative to the maximum value.

In the following, there will be considered only a few control sequences and the corresponding current waveforms. For these, it has been possible to compare the results obtained by an electronic simulation program ("SPICE") with the experimental results attained by using a prototype of the control apparatus CM, comprising a three-phase electric motor MT used for household electrical appliances.

Further, for each Cartesian graph, a particular time interval is taken in consideration and illustrated in which variation of some physical quantities is shown. It will be understood that outside said illustrated time interval, the variations are repeated periodically if not specified differently.

In the given square wave control sequence T1', T2', T3', B1', B2', B3' of FIG. 6, the "high" voltage or current signal corresponds to the closed (short-circuited static electronic component T1, T2, T3, B1, B2, B3, while the "low" signal corresponds to the open static electronic component T1, T2, T3, B1, B2, B3 (open circuit). Supposing the shunt device RS does not intervene limiting the phase currents I1, I2, I3, the waveforms I1', I2', I3' of FIG. 7 are attained.

Figure 7:
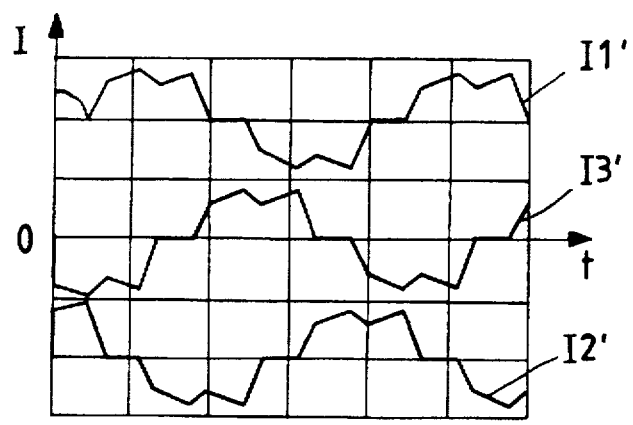
FIG. 7 is a Cartesian graph showing schematically the variation of tree phase currents relative to the first control sequence shown in FIG. 6.

On analyzing the graphs of FIG. 6 and FIG. 7, it can be observed that the phase currents I1', I2', I3' exhibit a particular behavior proximate to the switching from "high" to "low" and vice versa of static electronic components T1, T2, T3, B1, B2, B3.

Figure 8:
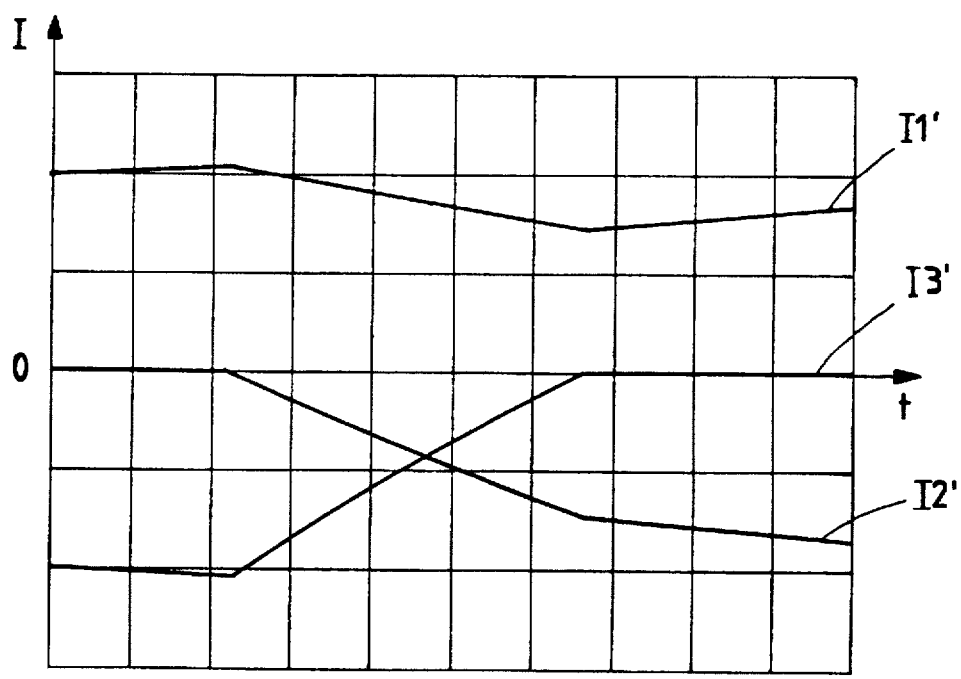
FIG. 8 shows an enlarged view of a detail of the Cartesian graph of FIG. 7.

Particularly, In FIG. 8 there is shown the variation of phase currents I1', I2', I3' at the switching of static electronic components T1, B3, B2: current I3' is set to zero through the current recirculation diode D3. Current I2' begins to increase (in absolute value); current I1' (the algebraic sum of currents I2' and I3') decreases (in absolute value) in the time interval where setting to zero of the current I3' prevails, and then it starts to increase again (always in absolute value) following the variation of current I2'.

Due to the high voltage supply of the bridge and the low resistance of the coils of the phases of motor MT, intervention of shunt device RS becomes necessary. (The shunt device limits the current in the phases of the motor at a preset value). In this case the control sequence of the static electronic components T1, T2, T3, B1, B2, B3 becomes the one depicted in FIG. 9 (T1", T2", T3", B1", B2", B3") and the corresponding phase current waveforms I1", I2", I3" become as those shown in FIG. 10.

Figure 10:
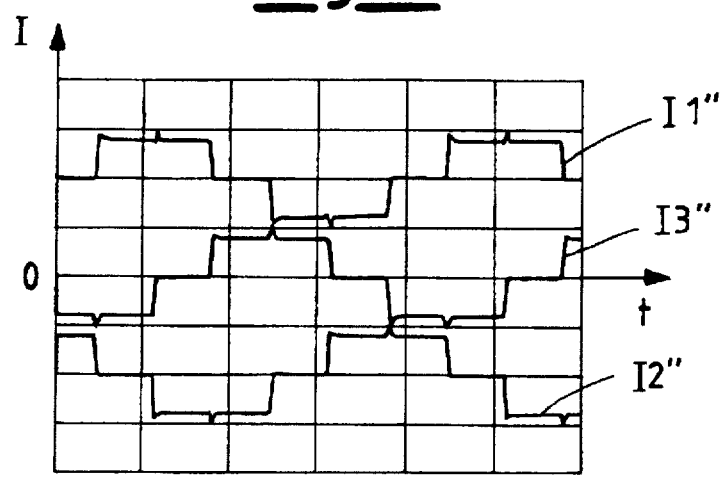
FIG. 10 is a Cartesian graph showing schematically the variation of the three phase currents as a function of time, relatively to the second control sequence of FIG. 9.
Figure 11:
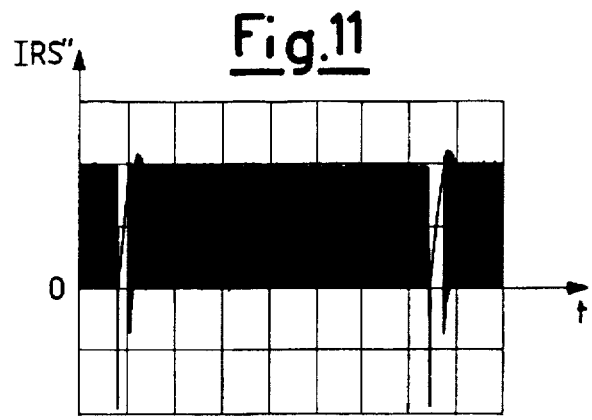
FIG. 11 is a Cartesian graph showing schematically the variation of the phase current flowing in the shunt device of the control apparatus of this invention.

From FIG. 10 it can be observed that the currents I1', I2', I3', have a short transient state (current spike) at the switching of static electronic components T1, T2, T3, B1, B2, B3. During switching, the control of the current is lost because of intervening current recirculation diodes D1, D2, D3, D1', D2', D3'. As a consequence, the current in phases I1", I2", I3" is not the same current IRS" in the shunt device RS. In Fact, the current IRS" flowing in the shunt device RS varies with time as shown in FIG. 11. It is set to zero at each switching of static electronic components T1, T2, T3, B1, B2, B3 and, during the time interval in which the shunt device RS is not activated (because its current IRS" is not exceeding the limit value), the current in each phase I1", I2", I3" is given by the sum of the currents in the shunt device RS (IRS") and the current recirculation diodes D1, D2, D3, D1', D2', D3', in which the current of the switching off phase I1", I2", I3" flows.

The phenomenon can be better observed by widening the waveforms of the phase currents I1", I2", I3" (FIG. 13) and the control signals T1", B3", B2" (FIG. 12) at the switching of switches T1, B3, B2.

The absolute value of the current I2" increases, the absolute value of current I3" decreases, while the current I1" (algebraic sum of I2" and I3") begins to rise (in absolute value) where the increase of I2" prevails on the decrease of I3", then it starts to decrease again, following current I2".

Free switching off of the phase through the current recirculation diodes D1, D2, D3, D1', D2', D3' must be prevented not to lose control of the current during switching of static electronic components T1, T2, T3, B1, B2, B3. This is attained by prolonging, with respect to prior art, the duration of the time interval M by a suitable time interval M2 for controlling static electronic components T1, T2, T3, B1, B2, B3. Control is carried out by using a modulated signal with a PWM modulation method.

The time interval M2 should allow phase current I3'" to be set to zero, but it should not exceed the time used by an element of the motor MT to pass from a relative position reference (between parts of the inductor and parts of the armature) to another relative position reference spaced apart 30 electric degrees, not to generate a negative phase torque CF due to the inversion of the e.m.f. of motor MT.

Figures 12, 14:
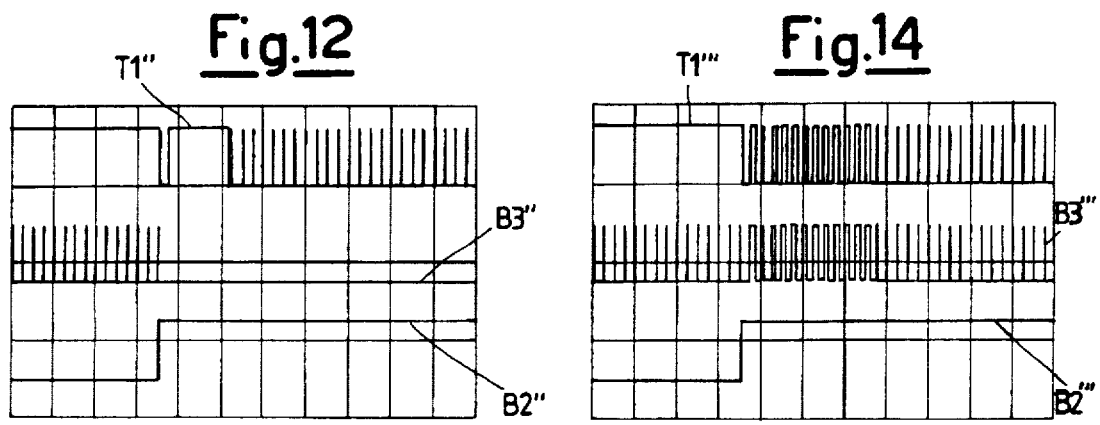
FIG. 12 schematically shows an enlarged view of a detail of the Cartesian graph of FIG. 9.
FIG. 14 is a Cartesian graph showing schematically a detail of a third control sequence for controlling static electronic components in accordance with this invention.
Figures 13, 15:
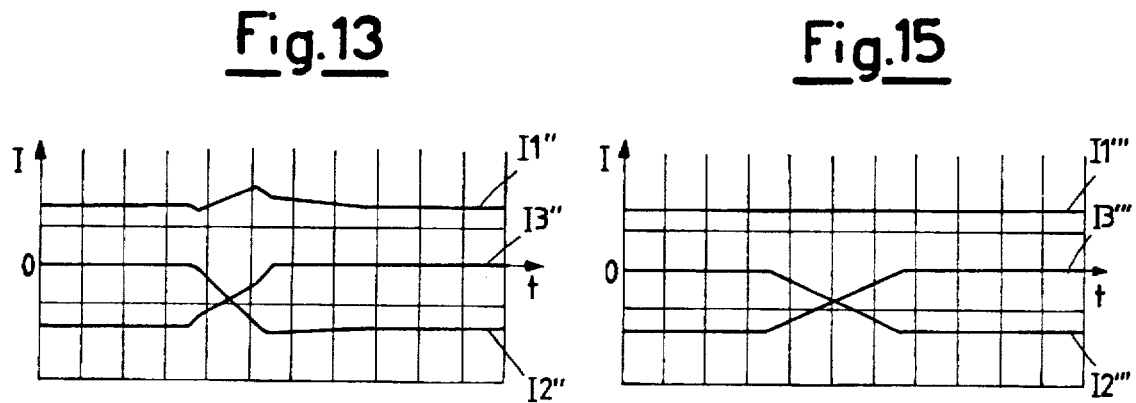
FIG. 13 is a Cartesian graph showing schematically the variations of the phase currents relative to the detail shown in FIG. 12.
FIG. 15 is a Cartesian graph showing schematically the variation of the phase currents relative to the third control sequence of FIG. 14, in accordance with the present invention.

FIGS. 14 and 15 show the waveforms of the control signals T1'", B3'", B2'" and the corresponding phase currents I1'", I2'", I3'" proximate to the switching of static electronic components T1, B3, B2, which are controlled in accordance with this invention.

Figure 18:
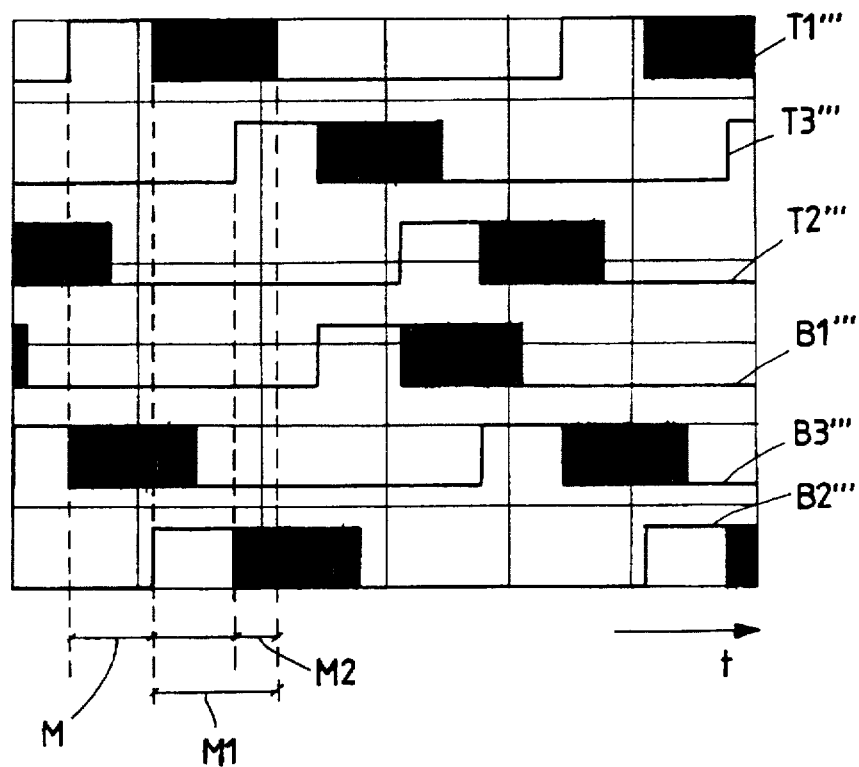
FIG. 18 is a Cartesian graph showing schematically the control sequence for controlling the static electronic components of the control apparatus of this invention, as a function of time.

FIGS. 18 and 19 show the control sequence T1'", T2'", T3'", B1'", B2'", B3'" complete for all the static electronic components T1, T2, T3, B1, B2, B3 and the waveforms of the phase currents I1'", I2'", I3'", respectively.

Figure 16:
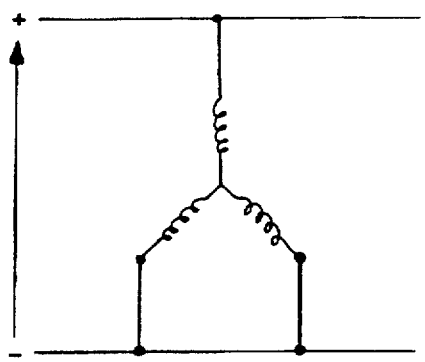
FIG. 16 schematically shows the arrangement of the phases of the motor, in the event the signals arriving at the static electronic components forming each phase current conductive branch are synchronized and both the components are closed.
Figure 17:
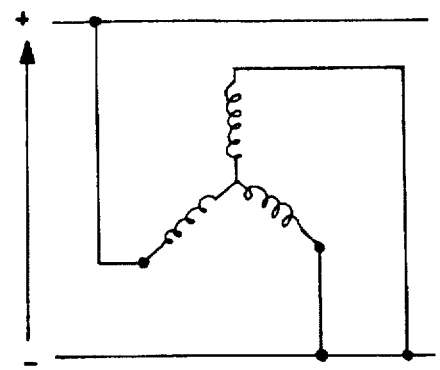
FIG. 17 schematically shows the arrangement of the phases of the motor, in the event the signals arriving at the static electronic components forming each phase current conductive branch are synchronized and both the components are open.

During the modulation time interval M2 (difference between the modulation time interval M of FIG. 18 concerning the control method of the present invention and the conventional modulation time interval M of FIG. 9) the control signals T1'" and B3'" are synchronized, whereby the phases of motor MT can take different configurations: the first, relative to "high" control signals T1'", B3'" (FIG. 16), the second relative to "low" control signals T1'", B3'" (FIG. 17).

Figure 9:
FIG. 9 is a Cartesian graph showing schematically a second control sequence for controlling the static electronic components, supposing the shunt device is activated limiting the phase current.

In FIG. 18, similarly to FIG. 9, there are indicated the modulation time intervals M, M1 and the time interval difference M2=M1−M only at the switching of static electronic components T1, T2, T3, B1, B2, B3 for illustration purposes. The same definitions equally apply to all the other switching of components T1, T2, T3, B1, B2, B3 provided in apparatus CM (and which are visible, at periodical time intervals, in FIGS. 9 and 18).

By analyzing FIGS. 15, 16 and 17 it can be observed that:

the phase current I3'" decreases a first value in the second phase arrangement (of FIG. 17) of the motor and increases a second value in the first arrangement (that of FIG. 16). The phase current I3'" is set to zero as the absolute value of said first value relative to the second arrangement is greater than the absolute value of the first arrangement;

the phase current I2'" continues decreasing to the limit current value set by the shunt device RS, as the phase corresponding to current I2" does not undergo any electric variation in passing from an arrangement to the other;

the phase current I1'", which is the algebraic sum of phase currents I2'" and I3'", has no longer the quick transient state (the spike), but remains always under the limit current value set by shunt device RS.

In FIGS. 20 and 21 there are compared the graphs as a function of time of the total torque C", C'" of motor MT respectively attained through the control sequences of FIG. 6 and FIG. 18. It can be noted that by following the control method of this invention (FIG. 18) the torque ripple decreases considerably. The same advantage (here visible) from a mechanical point of view can be appreciated as less noise is generated, because ripples cause vibration of the structure. Moreover, the switching noise is substantially reduced as quick switching is limited, which cause quick transients of phase current (spikes), which in turn yield radial instant forces at the air gap of the electric motor, low centrifugation of active torque and inner stresses with strain of the structure and consequent acoustic noise.

The experimental results herein reported have been measured at low rotational speed of the three-phase electric motor MT and with a control signal of the static electronic components modulated with a PWM technique at a 20 kHz frequency.

With electric machines having a torque-speed characteristic in which the torque is inversely proportional to the motor speed, the same experimental results can be attained also at high rotation speed as long as the frequency of the PWM modulated control signal of the static electronic components is increased.

Figure 22:
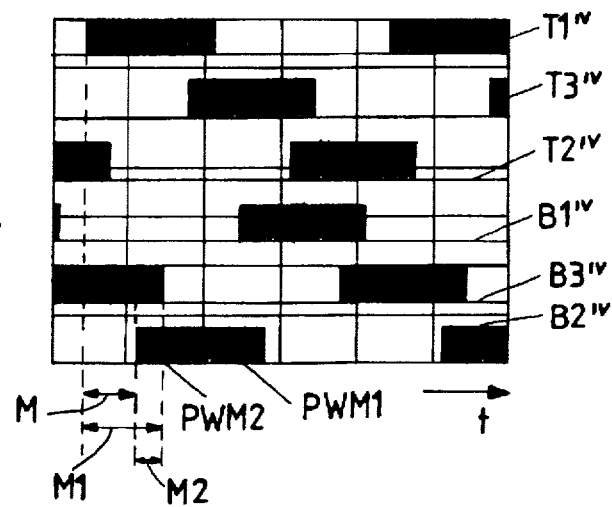
FIG. 22 is a Cartesian graph showing schematically an alternative control sequence for controlling the static electronic components of the control apparatus of this invention, as a function of time.
Figure 23A:
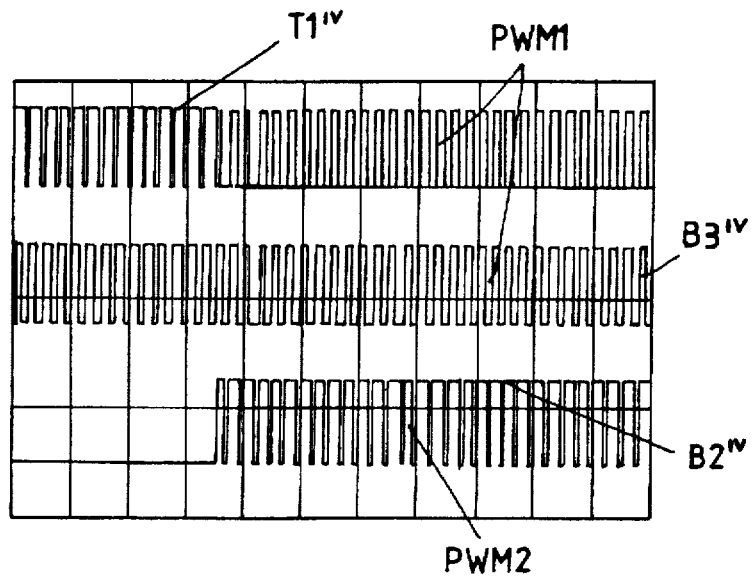
FIGS. 23A and 23B depict details of the switching of control signals and phase currents, respectively.
Figure 23B:
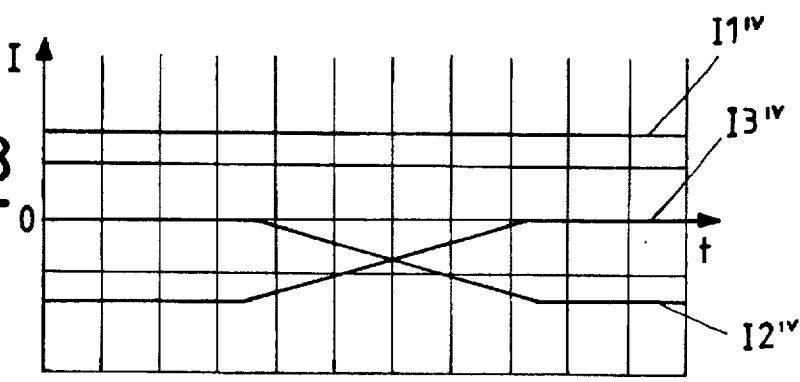

Referring now to FIG. 22, according to an alternative control sequence further reduction of switching noise and torque ripple is achieved by reducing the inclination of increasing and descreasing phase currents. During B3 and B2 switching (FIG. 23A) the power device B2 is controlled by signal PWM2 instead of being controlled by a full wave signal (high signal). This allows current I2 of phase 2 to increase more slowly and, as a result, phase 3 goes to zero more slowly, as shown in FIG. 23B.

Figure 24:
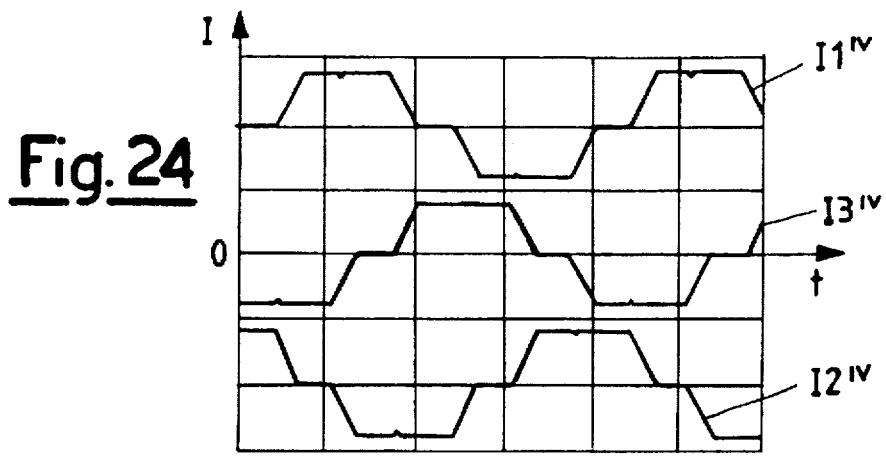
FIG. 24 depicts the current waveforms attained by the control sequence in accordance with FIG. 24.
Figure 25A:
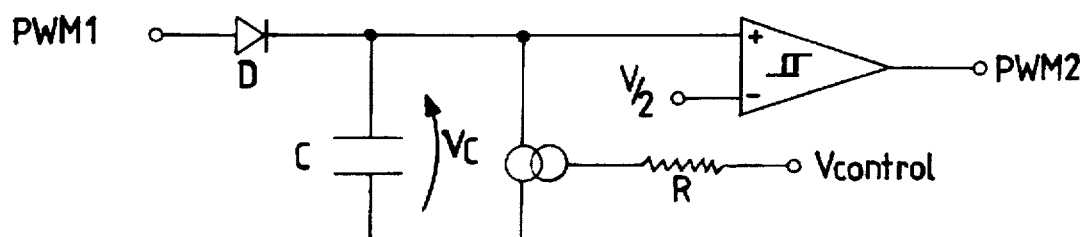
FIG. 25A shows a PWM delaying circuit.
Figure 25B:
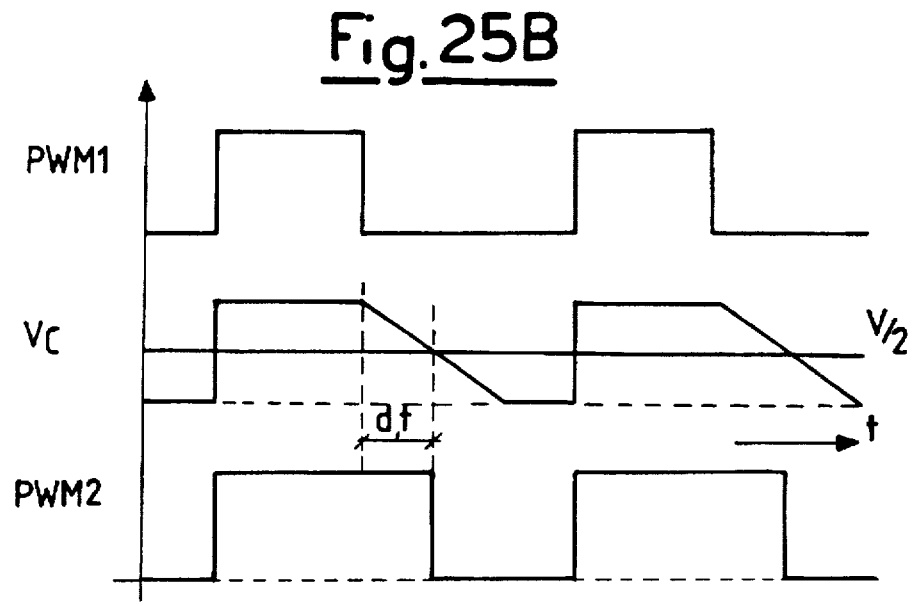
FIG. 25B is a graph showing PWM signals and voltage as a function of time.

The duty cycle of PWM2 should be greater than that of PWM1 (the latter being generated by the current limiting circuit) in order to get I3 current down to zero and increase current I2. If the two duty cycles were equal, the two currents would tend to an intermediate value of I/2. It is possible to increase slowly one current to its steady condition value while bringing the other to zero by introducing a "dt" difference between the two PWMs. Accordingly, inclination of the raising and decreasing portions of the phase currents can be controlled by adjusting the extension "dt" of PWM2 relative to PWM1. FIG. 24 depicts the current waveforms attained by the new control sequence. Current resetting to zero should still occur within 30 electrical degrees to avoid negative torque. However, to reduce switching noise as much as possible, current should be taken to zero slowly, i.e. as close as possible to 30 electrical degrees. The PWM2 signal with a variable "dt" delay can be accomplished by PWM1 by means of a simple circuit delaying the decreasing portions, as shown in FIG. 25A. In order to achieve the desired slow current decrease (proximate to 30 electrical degrees) the control voltage (FIG. 25B) allowing to change the DT delay can be generated by a microprocessor as a function of the phase currents and the motor revs as expressed by the equation:

$$dt \propto 1/V_{control} \propto k_1 \cdot I + K\omega \cdot \omega$$

wherein $k_1$ and $K\omega$ are constants which depend on the motor and the supplying system.

The features and advantages of the method and apparatus for controlling static electronic components according to the present invention should be apparent from the foregoing description. Particularly, the advantages are given by:

- an overall reduction of the ripple of the phase torque with time, with respect to known solutions, with a consequent noise reduction of the three-phase brushless motor;
- a reduction of the phase current transient states, in comparison with prior art, due to a reduction of quick switching of static electronic components;
- a reduction, with respect to prior art, of the instant radial forces at the air gap of the motor, with a consequent centrifuging of the phase torque, a decrease of inner stresses, structure strain and acoustic noise;
- an amplification, with respect to conventional techniques, of the control apparatus for controlling static electronic components, as a single shunt device is used in the apparatus, instead of a number of shunt devices equal to the number of phases of the motor;
- cost saving in comparison with prior art solutions.

Finally, it will be apparent that the embodiments described above are merely exemplary of the control method and apparatus of the invention and that persons skilled in the art may make many modifications without departing from the spirit and scope of the invention. All such modifications and variations are intended to be included within the scope of the invention as defined by the appended claims.

We claim:

1. A method of controlling static electronic components for switching phases in a three-phase brushless motor, comprising:

generating digital electric control signals by a signal generator device, controlling opening and closing of said static electronic components in response to said electric control signals according to a predetermined control sequence, so that there is at least one electric circuit branch composed of a series of at least two static electronic components and at least two phases of said motor;

pulse width modulating alternatively two of said at least two static electronic components, so as to limit a phase current of the motor to a preset value so as to provide a periodical, symmetrical phase current waveform with limited ripple relative to a square wave, said modulating being performed for a preset time interval longer than a first modulation time interval, the first modulation time interval corresponding to a time between commencement of modulating and switching on another static electronic component, a second time interval consisting of a difference between said preset and said first time intervals, being such as to allow to set to zero at least one of the phase currents being switched off.

2. A method as claimed in claim 1, wherein said second time interval is less than a time required for a reference element of said motor to pass from a first position relative to parts of an inductor and an armature of the motor, to a second position spaced apart 30 electric degrees from said first position, whereby negative phase torque due to inversion of e.m.f. in the motor is prevented.

3. A method as claimed in claim 2, further comprising synchronizing said control signals of at least two of said static electronic components during said second time interval so that the phase of the motor can reach at least two different configurations, corresponding to at least two different voltage or current levels of said digital electric control signals.

4. A method as claimed in claim 1, wherein said modulating is performed in a pulse width modulation mode, using a 20 Hz frequency signal at a low rotation speed of the motor.

5. A method as claimed in claim 1, wherein said motor exhibits a torque inversely proportional to motor speed and further comprising pulse width modulating using a signal exceeding 20 Hz frequency at a high rotation speed of the motor.

* * * * *